US010098277B2

(12) United States Patent
Ouyang

(10) Patent No.: US 10,098,277 B2
(45) Date of Patent: *Oct. 16, 2018

(54) ROBOTIC LAWN MOWER WITH BOUNDARY STANDS

(71) Applicant: Chien Ouyang, Pleasanton, CA (US)

(72) Inventor: Chien Ouyang, Pleasanton, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 15/256,374

(22) Filed: Sep. 2, 2016

(65) Prior Publication Data
US 2016/0366818 A1 Dec. 22, 2016

Related U.S. Application Data

(63) Continuation-in-part of application No. 13/572,601, filed on Aug. 10, 2012, now Pat. No. 9,471,063.

(60) Provisional application No. 61/574,866, filed on Aug. 11, 2011.

(51) Int. Cl.
A01D 34/00 (2006.01)
G05D 1/02 (2006.01)

(52) U.S. Cl.
CPC ........... A01D 34/008 (2013.01); G05D 1/028 (2013.01); G05D 1/0219 (2013.01); G05D 1/0255 (2013.01); G05D 1/0265 (2013.01); G05D 2201/0208 (2013.01)

(58) Field of Classification Search
CPC .... G05D 1/0255; G05D 1/0265; G05D 1/028; G05D 1/0219; G05D 2201/0208; A01D 34/00

USPC .............................................................. 701/2
See application file for complete search history.

(56) References Cited

U.S. PATENT DOCUMENTS

| 2008/0039974 A1* | 2/2008 | Sandin ................. G05D 1/0255 700/258 |
| 2008/0262669 A1* | 10/2008 | Smid .................... G05D 1/0278 701/23 |
| 2009/0228165 A1* | 9/2009 | Ozick ....................... A47L 5/30 701/23 |
| 2010/0141483 A1* | 6/2010 | Thacher ................ G01S 13/825 340/989 |
| 2010/0156660 A1* | 6/2010 | Lee ......................... G01S 13/82 340/8.1 |
| 2011/0166707 A1* | 7/2011 | Romanov ................. G01S 5/16 700/255 |
| 2012/0265391 A1* | 10/2012 | Letsky ................. A01D 34/008 701/25 |

(Continued)

Primary Examiner — Atul Trivedi
(74) Attorney, Agent, or Firm — Foley & Lardner LLP; Cliff Z. Liu; Yiming Zhang

(57) ABSTRACT

At least some embodiments of the present invention disclose a robotic lawn mowing system coupled with boundary stands to control and to monitor the moving of the robotic lawn mower. The robotic lawn mower uses boundary stands to identify the lawn boundary, to determine the position of the robotic lawn mower in a lawn, and to define the mowing routes. The ultrasonic and RF devices are placed on the robotic lawn mower and on the boundary stands. Based on the disclosed technology, users can define and design the mowing routes to mow the lawn according to their preferences. The control of the robotic lawn mower may be wireless, and users may monitor and control the robotic lawn mower with a computer, a cell phone, or a tablet through a wireless network.

4 Claims, 16 Drawing Sheets

(56) References Cited

U.S. PATENT DOCUMENTS

| | | | |
|---|---|---|---|
| 2015/0234385 A1* | 8/2015 | Sandin | G05D 1/0265 700/258 |
| 2015/0366129 A1* | 12/2015 | Borinato | A01B 69/008 701/25 |
| 2017/0280289 A1* | 9/2017 | Skaaksrud | H04W 64/006 |

* cited by examiner

Robotic lawn mower

Each boundary stand

ROBOTIC LAWN MOWER WITH BOUNDARY STANDS

CROSS REFERENCE TO RELATED APPLICATION

This application is a continuation-in-part of U.S. application Ser. No. 13/572,601, filed Aug. 10, 2012; which claims the priority of U.S. Provisional Application No. 61/574,866, filed Aug. 11, 2011. The contents of the above-identified applications are incorporated herein by reference in their entirety.

FIELD OF THE INVENTION

The present invention relates to lawn mowers.

BACKGROUND OF THE INVENTION

People use lawn mowers to do the lawn work so as to save their time and energy for other things. A robotic lawn mower is an autonomous robot used to cut lawn grass. A typical robotic lawn mower requires the users to set up a wire at the lawn border to enclose the grass area to be mowed. The robotic lawn mower detects the electromagnetic signal from the wire when it is near the border so as not to travel outside the enclosing area, and in typical applications, the robotic lawn mower follows the wire back to the docking station for battery recharging. However, the conventional robotic lawn mowers although with a microcontroller or a CPU embedded on them, are still not smart enough to allow users to control the mowing routes in a precise and flexible manner.

BRIEF DESCRIPTION OF THE DRAWINGS

A better understanding of the present invention may be obtained when the following detailed description is considered in conjunction with the following drawings, in which.

DETAILED DESCRIPTION OF THE INVENTION

Figure 1:
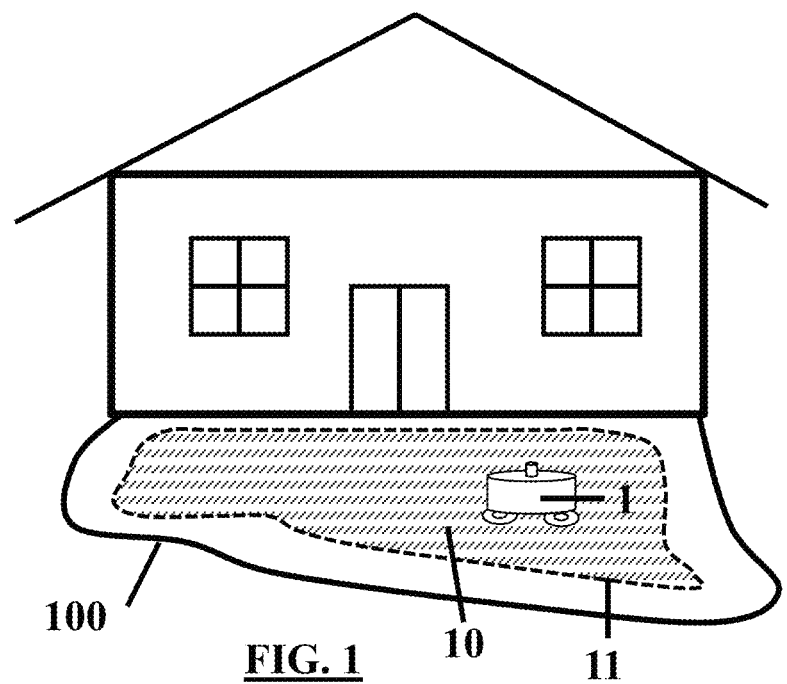
FIG. 1 illustrates a robotic lawn mower in a lawn.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

Conventional robotic lawn mowers are not smart enough to allow users to use it at different lawns, to vary the mowing areas, to identify mower's position with respect to lawn border, and to control and monitor the mowing route precisely whether the mower is near the border or in the middle of the lawn. For example, users may want to mow his or her house's lawn today, but tomorrow would like to help mow neighbor's lawns. The setup of wire at neighbor's yard is impractical and inconvenient. If user is a gardener, the person will need to mow different lawns which have different landscapes and are at different locations, such that the setup of the wires will become extremely difficult and time consuming. Another situation is that users may want to mow a specific area of the lawn today and to mow another specific area of the lawn tomorrow, and users may like to mow several areas of the lawn to follow a predetermined route or path. In these regards, a smart robotic lawn mowing system which is able to identify the lawn areas, to vary the mowing areas, and to track the position of the mower during its operation is needed. Another application is that users may want to monitor and to modify the mowing through a wireless network or an internet. The invention here is to address these needs.

From the point of energy saving, a robotic lawn mower which is able to mow the lawn efficiently is important. A smart mowing scheme is able to cover the entire lawn area but not to keep mowing the same spots repeatedly. The traditional robotic lawn mower are not equipped with smart boundary devices, and therefore, they may either keep mowing some spots repeatedly or miss mowing some spots in a lawn. With this invention, the smart robotic lawn mower with smart boundary devices, user is able to control the mowing route, to avoid the repetition of the mowing the same spots, and to identify the position of the robotic lawn mower in a lawn. With smart boundary devices, the robotic lawn mower is able to cover the spots that might be missed when using the traditional robotic lawn mower.

As disclosed in this application, a smart robotic lawn mowing system, which allows users to freely use it at different lawns and at different areas of a lawn, is disclosed. The core of the invention is to place the ultrasonic and the RF devices on the robotic lawn mower and on the boundary stands. The boundary stands here refer to the extrusion devices to be inserted near the lawn border to guide the moving of the robotic lawn mower and to define the lawn border. An ultrasonic transmitter is placed on the robotic lawn mower, and the ultrasonic receivers are placed on the boundary stands. The RF transceivers are placed on both the robotic lawn mower and boundary stands. The RF transceivers can either transmit or receive RF signals. The boundary stand may be a fence, a post, a solar light, a wood stick, or any other similar entities with the ultrasonic and the RF devices placed on them. The popular solar lamps, populating in the yards near the houses, are a good example for the placement of the boundary stands. The boundary stands shall be flexible to be set up, and they can be put on or removed easily, and they are portable to be placed at different areas in the lawn, or different lawns at different locations. The ultrasonic transmitter on the robotic lawn mower transmits an ultrasonic wave signal toward the boundary stands, and the ultrasonic receivers on the boundary stands receive the ultrasonic waves from the robotic lawn mower. The RF device on the robotic lawn mower transmit the RF signal to the boundary stands to synchronize or calibrate the time clocks of boundary stands, and to receive the distance data from the boundary stands. The RF devices on the boundary stands transmit distance data to robotic lawn mower, and to receive RF signal from robotic lawn mower for the synchronization and calibration of time clocks.

With the boundary stands, the robotic lawn mower defines its relative position to the boundary stands, such that the position of mower in a lawn is tracked and monitored. With the known relative positions of robotic lawn mower and boundary stands, mower may define a mowing route, such that the robotic lawn mower may mow the lawn according to users' designated or preferred routes. With this disclosure, the mowing route and mowing pattern may be controlled, monitored, and modified by users at either local or remote sites.

At least some embodiments of the present invention provide a robotic lawn mowing system coupled with boundary stands to control and to monitor the moving of the robotic lawn mower. The robotic lawn mower uses boundary stands to identify the lawn boundary, to determine the position of the robotic lawn mower in a lawn, and to define the mowing routes. The ultrasonic and RF devices are placed on the robotic lawn mower and on the boundary stands. Based on the disclosed technology, users can define and design the mowing routes to mow the lawn according to their preferences. The control of the robotic lawn mower may be wireless, and users may monitor and control the robotic lawn mower with a computer, a cell phone, or a tablet through a wireless network.

Robotic lawn mower can be equipped with sensors to detect if there is a rain and to detect grass and non-grass areas, and some mowers can control the blade speed based on grass height and travel in spiral pattern when longer grass is found.

In one embodiment, the robotic lawn mowing system contains a robotic lawn mower and a plurality of boundary stands.

In one embodiment, the robotic lawn mower contains an ultrasonic transmitter and an RF transceiver.

In one embodiment, each boundary stand contains an ultrasonic receiver and an RF transceiver.

In one embodiment, the boundary stands are placed on the ground near the borders of the mowing areas to define the lawn boundary.

In one embodiment, the ultrasonic transmitter on the robotic lawn mower broadcasts ultrasonic waves toward boundary stands, the ultrasonic receivers on the boundary stands receive the ultrasonic waves from the robotic lawn mower.

In one embodiment, the relative distances between robotic lawn mower and boundary stands are determined by the time-of-flights of ultrasonic waves.

In one embodiment, the RF transceiver on the robotic lawn mower transmits RF signals toward boundary stands to synchronize and calibrate the clock times of the boundary stands, and to receive the distance data from boundary stands.

In one embodiment, the RF transceivers on the boundary stands receive RF signal from robotic lawn mower to synchronize and calibrate the clock times of boundary stands, and to transmit the distance data to robotic lawn mower.

In one embodiment, the boundary stands define the lawn areas and confine the robotic lawn mower in the lawn, and robotic lawn mower identifies its position with respect to boundary stands in a lawn, based on the distance data to the boundary stands.

In one embodiment, the robotic lawn mower travels to first location to obtain the first set of relative distances in between the robotic lawn mower and the boundary stands, travels again a predetermined length in predetermined direction to second location to obtain the second set of relative distance in between the robotic lawn mower and the boundary stands. With the continuous traveling and continuous collection of distance data, the robotic lawn mower determines the relative positions of the robotic lawn mower and boundary stands.

In one embodiment, the boundary stand may be placed at the interior of lawn to guide the moving of the robotic lawn mower.

In one embodiment, the boundary stands are placed along the boundary of an object located in the lawn.

In one embodiment, the RF transceivers on the boundary stands send the condition signals to robotic lawn mower, and the condition signals include the information of environment where the boundary stands locate, boundary stand group number, and boundary stand ID number.

In one embodiment, a large lawn area may be split virtually to a plurality of smaller lawn areas, each area may be enclosed by a group of nearby boundary stands, when the robotic lawn mower enter each smaller area, the mower may use the group of nearby boundary stands to determine its mowing route in the area.

In one embodiment, a plurality of boundary stands define the battery charge station area and to guide the mower to the charge station.

In one embodiment, one or more than one of the boundary stands may be used to guide the first moving of the robotic lawn mower which is originally located at battery charge station.

In one embodiment, a CPU or a microcontroller may be on the robotic lawn mower and on the boundary stands to do the calculation and analysis. The calculation determines the lawn area, tracks the position of the robotic lawn mower, and determines the mowing route, mowing pattern, mowing speed, mowing frequency, and mowing period.

In one embodiment, the robotic lawn mower has a memory device for the storage of distance data, and a map of mowing areas may be stored in the memory device.

In one embodiment, the moving of the robotic lawn mower may be monitored and controlled locally or remotely by a computer, a cell phone, or a tablet.

At least some embodiments relate to a robotic lawn mower 1 coupled with a plurality of boundary stands 2. The mowing routes and patterns are controlled and monitored with the usage of boundary stands. Each boundary stand contains an ultrasonic receiver and an RF transceiver for the purposes of distance measurements and data communications. The system may firstly determine the lawn area or lawn boundary. After the determination of the lawn area or lawn boundary, the robotic lawn mower 1 starts to mow the lawn and a tracking method is used to track the position of the robotic lawn mower 1. After knowing the lawn area and mower's position, a microcontroller or a CPU on the mower may determine the mowing routes and patterns. The mowing routes and patterns may be predetermined and programmed by users, or determined by the microcontroller on the mower. With this disclosure, the robotic lawn mower 1 avoids the repetition of mowing the same places, and the robotic lawn mower 1 is able to cover all the mowing areas without missing spots. Furthermore, a lawn may be split to several areas virtually with a program, and the robotic lawn mower 1 may mow the lawn with an area-by-area scheme, and the mowing may be monitored and controlled by a computer or a cell phone through a local or remote wireless network. With the disclosure here, users may utilize the system for their own lawns, their neighbor's lawns, or any other different lawns at different locations without the need to set up the electric wires. The disclosed robotic lawn mowing system allows users to vary their mowing areas and mowing routs depending on their needs and preferences.

The advantages of the robotic lawn mower 1 are explained in detail in the text and with figures below. FIG. 1 illustrates a typical application of a robotic lawn mower 1. The robotic lawn mower 1 mows an area 10 enclosed by the lawn boundary 11 at a land 100. An important operation of the mower is not to travel outside the lawn boundary 11. In this regard, the traditional robotic lawn mower 1 sets up an electric wire beneath the ground and along the outer border of the lawn, to constrain the mower from traveling to outside. When the robotic lawn mower 1 travels near the wire, it senses the electromagnetic wave from the wire and changes its mowing directions. The disadvantage is that a pre-installation of the wire is required and it is difficult to use the robotic lawn mower 1 for other lawns. In many situations, users may like to vary their mowing areas depending on grass conditions or personal preferences. The traditional lawn mowers do not have the flexibility and current disclosure is to address these needs.

Figure 2:
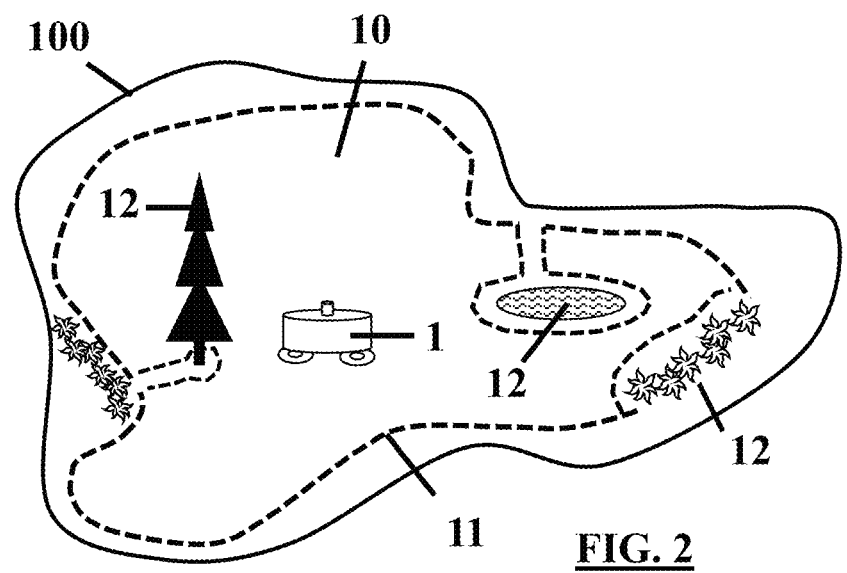
FIG. 2 illustrates a robotic lawn mower located in a lawn, and there are several block areas in the lawn.

FIG. 2 illustrates one example of the robotic lawn mower 1 to mow an area with several objects or block areas inside. The objects could be a bush of flowers, a swimming pool, a tree, or other things. The robotic lawn mower 1 is not allowed to go across these objects. In this application, the locations where these objects located are defined as block areas 12. The dashed line in the figure illustrates a possible way of setting up the wire such that the robotic lawn mower 1 does not go across the lawn border and block area 12. In one embodiment, the electric wire may be difficult to install for a complex geometry, and people may prefer not to dig the lawn to install the wires. In another embodiment, people may not want to mow the entire area in one shot, and may want to split the area virtually to several smaller areas and do the mowing of each small area at the times of their conveniences. In this regard, a smart robotic system will be needed for the situations.

Figure 3:
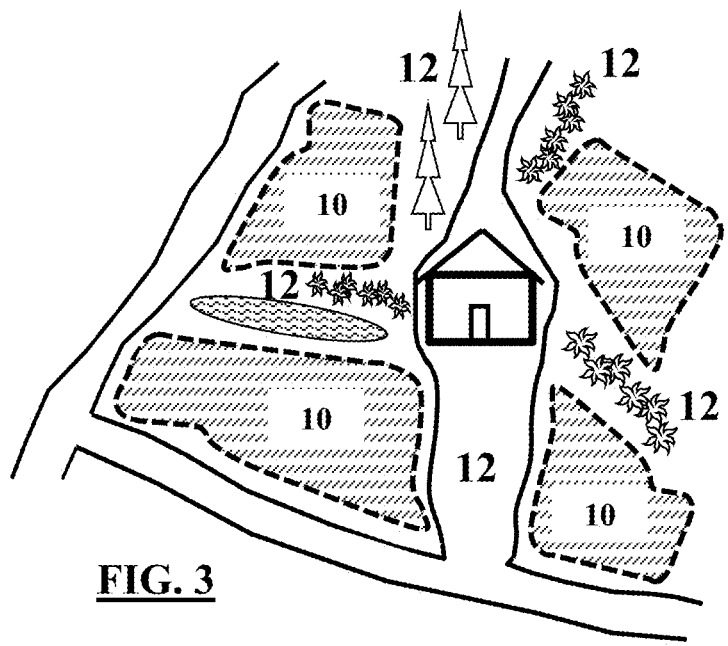
FIG. 3 illustrates several lawns separated by the block areas.

FIG. 3 illustrates a possible situation that the lawn areas 10 are separated from each other and are not connected together. The areas may be separated from each other by a bush of flower, a concrete road, a swimming pool, or some trees. For the situation, it is difficult to set up electric wires on each area's border, thus a smart robotic lawn mower 1 is preferred. Another situation is that people may want to mow different lawns at different places, and the lawn may have various geometries and it is not practical or inconvenient to use the wires. The installation of the electric wires for a gardener who likes to use the robotic lawn mower 1 for his many customers will be a very tedious work.

Figure 4:
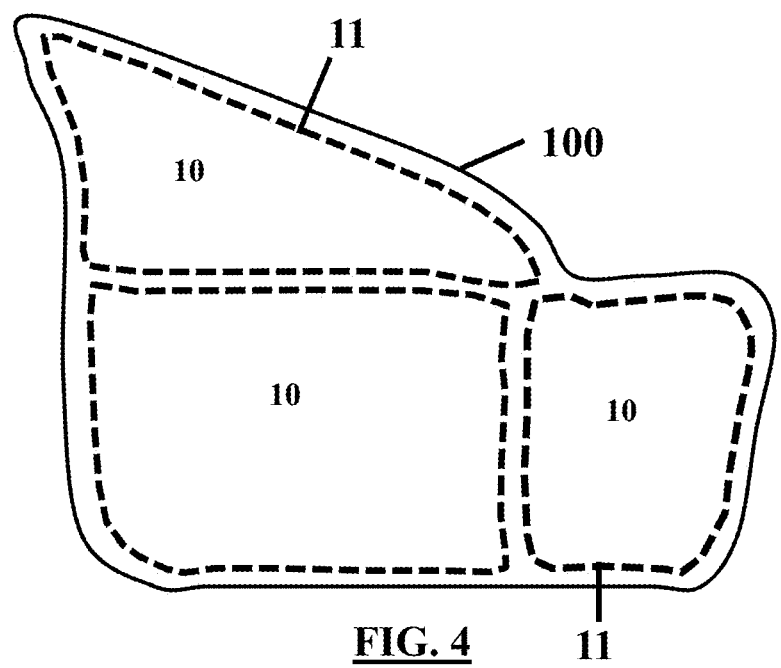
FIG. 4 illustrates a lawn is virtually split to several areas.

FIG. 4 illustrates that users may want to mow different areas of a lawn at different times even the areas are connected together, and may prefer to mow some areas more frequent than other areas. The dash lines in the figure represent the virtual boundaries of the areas. For the situation, the boundary stands 2 can define the mowing areas easily according to users' preferences. In one embodiment, the areas may be overlapped, connected, or disconnected.

In summary, a smart robotic lawn mower 1 system is needed for users to freely define their mowing areas, and to use the system at anywhere without the need to set up the electric wires. The application is very useful for a gardener who has many customers and the gardener needs to mow different lawns at different locations.

Figure 5:
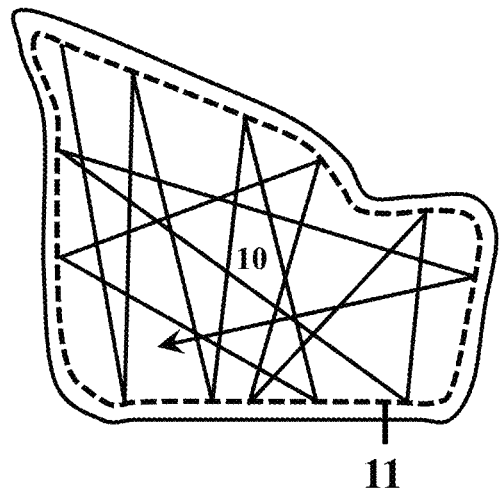
FIG. 5 illustrates an uncontrolled mowing route of a robotic lawn mower in a lawn.
Figure 6:
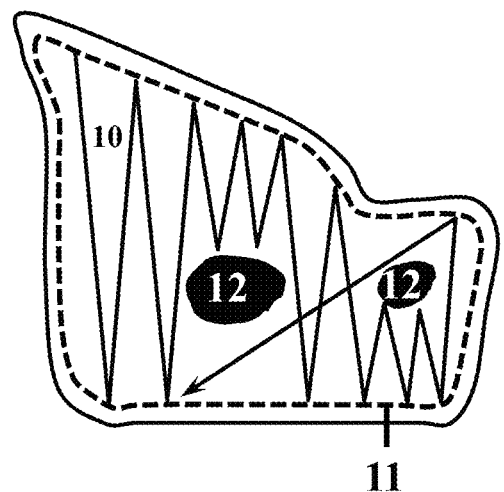
FIG. 6 illustrates a partially controlled mowing route of the robotic lawn mower.

FIG. 5 and FIG. 6 illustrate typical mowing routes from a traditional robotic lawn mower 1 without boundary stands 2. The mowing routes generally are random patterns or have simple assigned direction such as zigzag. For the situations, the mower may repeat the mowing of some same spots and may not cover entire lawn area without missing spots. The repetition of the mowing, as shown in FIG. 5, is a waste of the electric energy and it takes longer time to finish the lawn work. For a lawn which has several block areas 12 inside, such as the one shown in FIG. 6, the situation becomes more complicated and it may be difficult for traditional robotic lawn mowers 1 to cover entire lawn area without missing spots, because the mower does not have visions to look at the lawn situation. This disclosure, with boundary stands, offers a solution for the robotic lawn mower 1 to detect outer boundary of the lawn and internal block area 12. With this disclosure, the mowing route may be controlled without the repetition and without missing spots.

Figure 7:
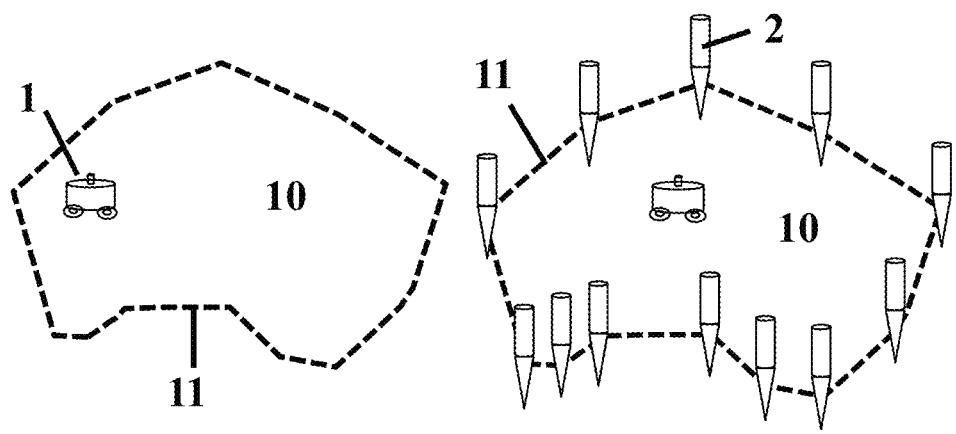
FIG. 7 illustrates a robotic lawn mower in a mowing area and boundary stands are placed at lawn border.

FIG. 7 illustrates the concept of the smart robotic lawn mower 1 coupled with boundary stands 2. The system contains one robotic lawn mower 1 and a plurality of boundary stands 2. The robotic lawn mower 1 does the yard work in the area of lawn 10, and the dashed line 11 in the figure represents the lawn boundary. To define the lawn area, the boundary stands 2 are placed along the border or the peripheral of the lawn. In one embodiment, more units of boundary stands 2 may better capture complicated geometry of the lawn area. However, if the lawn geometry is simple, very few boundary stands 2 may be enough. For a square lawn area, four boundary stands 2 may be enough to capture the lawn area. For a lawn which has several curves or irregular shapes at the border, more boundary stands 2 are needed to determine the lawn area. In one embodiment, the virtual connection of boundary stands 2 encloses the lawn area such that it functions as electric wire to confine the robotic lawn mower. In one embodiment, the boundary stands 2 are placed along the lawn border but their exact positions or coordinates are not given or predefined. The placement of boundary stands 2 is to capture the geometry of lawn area, and to confine the robotic lawn mower 1 in the lawn area, but the exact positions or coordinates of boundary stands 2 are not given or predefined. The predetermination of the coordinates or the exact positions of boundary stands 2 is very time-consuming and may be too complex for the applications of lawn mowing.

Figure 8:
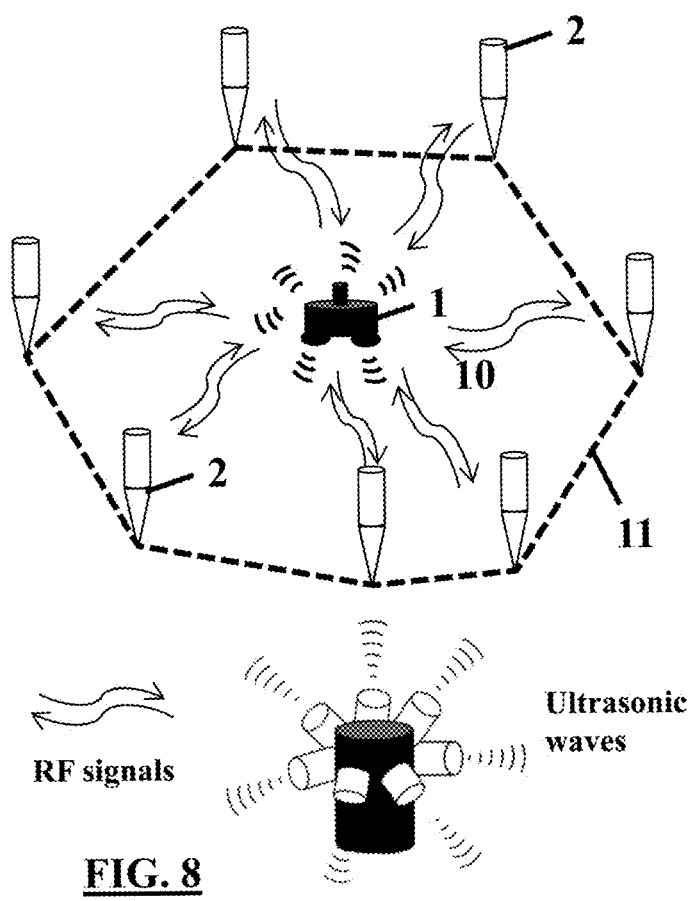
FIG. 8 illustrates a robotic lawn mower broadcast an ultrasonic signal toward boundary stands, and the robotic lawn mower and the boundary stands communicate with each other with RF transceivers.

FIG. 8 illustrates that the robotic lawn mower 1 has one or more than one ultrasonic transmitter to transmit ultrasonic waves, in radial direction, with a broadcasting manner, toward outer boundary stands 2. Each boundary stand 2 has an ultrasonic receiver to receive the ultrasonic wave transmitted from the robotic lawn mower 1. The distance in between robotic lawn mower and each boundary stand is determined based on the time-of-flight of ultrasonic wave traveling from robotic lawn mower 1 to each boundary stand 2.

To determine the time-of-flight of ultrasonic waves, the time clocks of the robotic lawn mower 1 and the boundary stands 2 must be synchronized or calibrated. In this regard, the robotic lawn mower 1 and each boundary stand 2 contain an RF transceiver, which is able to transmit or receive RF signals. The RF transceiver on the robotic lawn mower 1 transmits an RF signal toward each boundary stand 2, and the RF transceiver on each boundary stand 2 receives the RF signal from the robotic lawn mower 1. Each boundary stand 2, may use the time it receives the RF signal from the robotic lawn mower 1 to synchronize or calibrate the time clock. In one embodiment, the transmitted RF signal from the robotic lawn mower to the boundary stand may contain a time code, such that each boundary stand 2 may use the time code to synchronize or calibrate its time clock. The RF signal and light travel the same speed, and the distances between the mower and boundary stands 2 are extremely small and negligible when considering the speed of light, such that the time clocks of robotic lawn mower and boundary stands are synchronized or calibrated. With the synchronization of the time clocks of mower and boundary stands 2, the time-of-flights of ultrasonic waves, from robotic lawn mower 1 to each boundary stand 2, are measured.

In one embodiment, each boundary stand 2, upon the receiving of ultrasonic waves and the determination of time-of-flight of ultrasonic wave, transmits an RF signal back to the robotic lawn mower 1 to inform the robotic lawn mower 1 the relative distance in between the robotic lawn mower 1 and the boundary stand 2. In one embodiment, the mower and each boundary stand 2 contain a microcontroller to command the transmitting and receiving of sound and RF signals. The RF transceiver on the robotic lawn mower 1 receives the distance data from the boundary stands 2 such that the microcontroller on the mower uses the distance data to guide the moving of mower.

In one embodiment, the RF devices on robotic lawn mower 1 and the boundary stands 2 are configured as RF transceiver to transmit or receive signals. The RF device on the robotic lawn mower 1 functions as transmitter to transmit the RF signal to synchronize the clock times of boundary stands 2, and also functions as receiver to receive the distance data from each boundary stand 2. The RF device on each boundary stand 2 functions as a transmitter to transmit the distance data to the robotic lawn mower 1, and also functions as receiver to receive the RF signal from the robotic lawn mower 1. The ultrasonic device on the robotic lawn mower 1 functions as ultrasonic transmitter, and the ultrasonic device on each boundary stand 2 functions as ultrasonic receiver.

In one embodiment, the robotic lawn mower 1 system is configured to transmit ultrasonic waves, in radial direction, covering 360 degrees, toward boundary stands on the lawn plane. In one embodiment, the mower may comprise several ultrasonic transmitters to cover different directions, such that the ultrasonic transmitter on the robotic lawn mower 1 functions as an ultrasonic broadcaster to transmit ultrasonic waves. With the broadcasting of ultrasonic wave from robotic lawn mower 1 toward boundary stands 2, the receiving of ultrasonic waves from boundary stand 2, the synchronization and calibration of time clocks, the determination of the relative distances in between the robotic lawn mower 1 and the boundary stands 2, the transmitting of distance data from the boundary stands 2 to the robotic lawn mower, the robotic lawn mower 1 determines its relative distances to the boundary stands 2.

Figure 9:
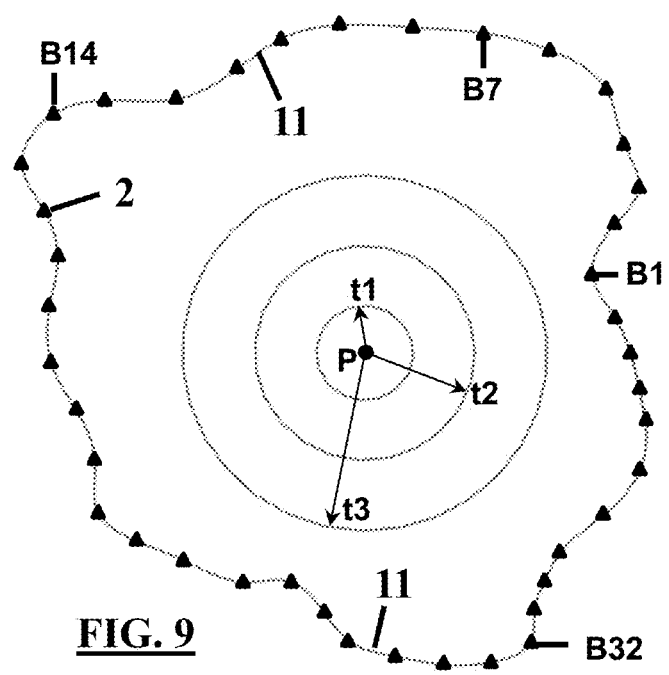
FIG. 9 illustrates the robotic lawn mower broadcasts an ultrasonic wave toward boundary stands.

FIG. 9 illustrates the mechanism to determine the relative positions of the robotic lawn mower 1 and boundary stands 2. The robotic lawn mower 1 is at a position in a lawn and it broadcasts an ultrasonic wave toward outer boundary stands 2. The circles represent the locations of sound waves as a function of time, for example, at time t1 the sound wave travels from mower at position P to first circle or inner circle, and at later time t3, the sound wave travels farther away from mower to the outer circle. The ultrasonic sound travels different time lengths and different distances to reach different boundary stands 2, for example, the time to reach the boundary stand B1 is shorter because boundary stand B1 is closer to the robotic lawn mower 1, and the time to reach the boundary stand B14 and B32 are longer because boundary stands B14 and B32 are farther away from the robotic lawn mower 1.

Figure 10:
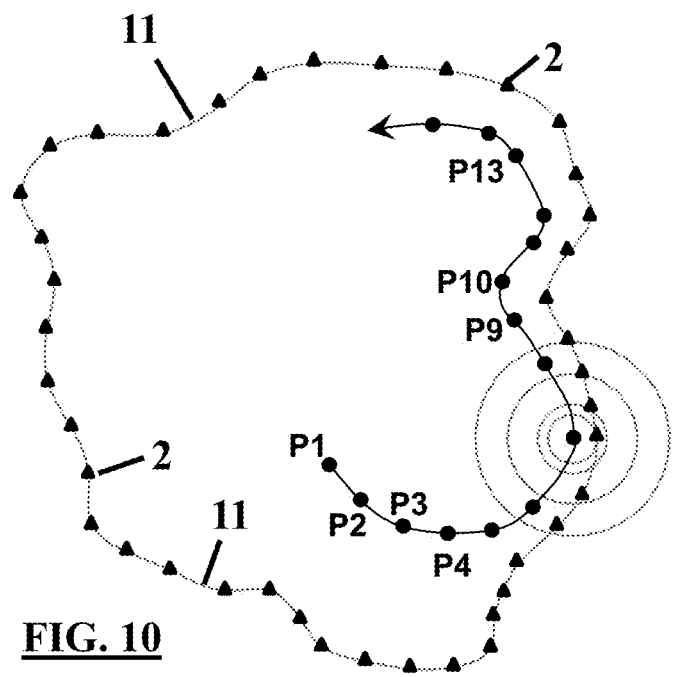
FIG. 10 illustrates mower travels in a lawn and broadcasts ultrasonic waves toward boundary stands.

FIG. 10 illustrates the robotic lawn mower travels different distances from position P1 to P2, P2 to P3, P3 to P4, and so on. At each position, the robotic lawn mower 1 broadcasts an ultrasonic wave toward boundary stands 2. In one embodiment, the robotic lawn mower 1 may travel different lengths to broadcast ultrasonic waves. A shorter length implies more frequent of sound wave broadcasting. In another embodiment, the robotic lawn mower 1 may broadcast more than one ultrasonic wave at the same position. In one embodiment, the robotic lawn mower 1 may adjust the frequency of sound broadcasting and the traveling lengths, depending on the lawn conditions. With the coupling of the RF signals and the ultrasonic waves, a plurality of the relative distances in between robotic lawn mower 1 and boundary stands at different times are obtained.

Figure 11:
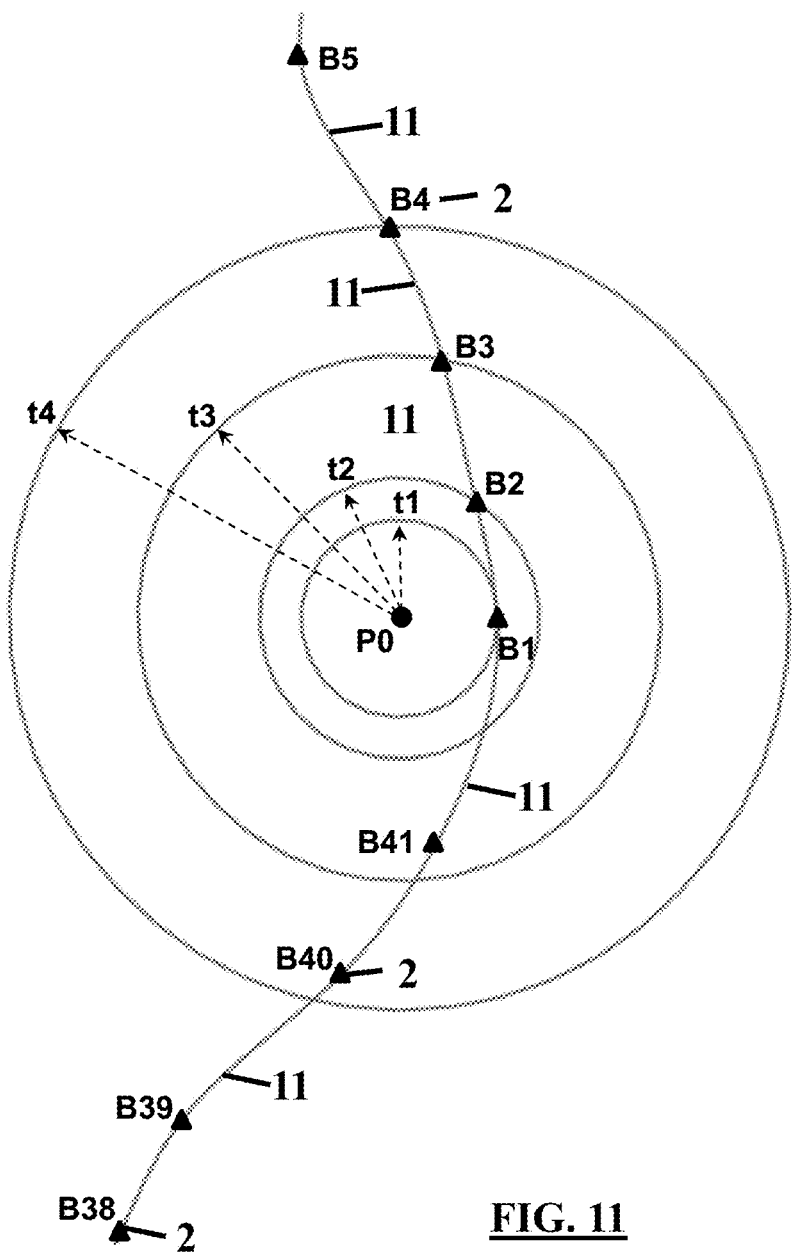
FIG. 11 illustrates the robotic lawn mower travels in a lawn and broadcasts ultrasonic waves toward boundary stands.

FIG. 11 illustrates the robotic lawn mower 1 is initially located at a position P0 and it broadcasts one ultrasonic wave toward boundary stands 2, such as boundary stands B1 to B4. The needed times for ultrasonic wave to reach boundary stands B1, B2, B3, and B4 are t1, t2, t3, and t4 respectively. The circles represent the locations of sound waves as a function of time. The boundary stand B1 is near the mower and the time t1 is shorter, and the boundary stand B4 is farther away from the mower thus the time t4 is longer. With the time-of-flights of ultrasonic sound waves, the distances in between the robotic lawn mower 1 and the boundary stands 2 are determined. The approach determines the distances in between the robotic lawn mower 1 and the boundary stands 2, but the positions of boundary stands 2 are not determined because the boundary stands 2 could locate at anywhere on the circles. Take the outer circle or the time t4, for example, the boundary stand B4 may be at anywhere at the outer circle, such that the position of B4 is not clearly defined.

Figure 12:
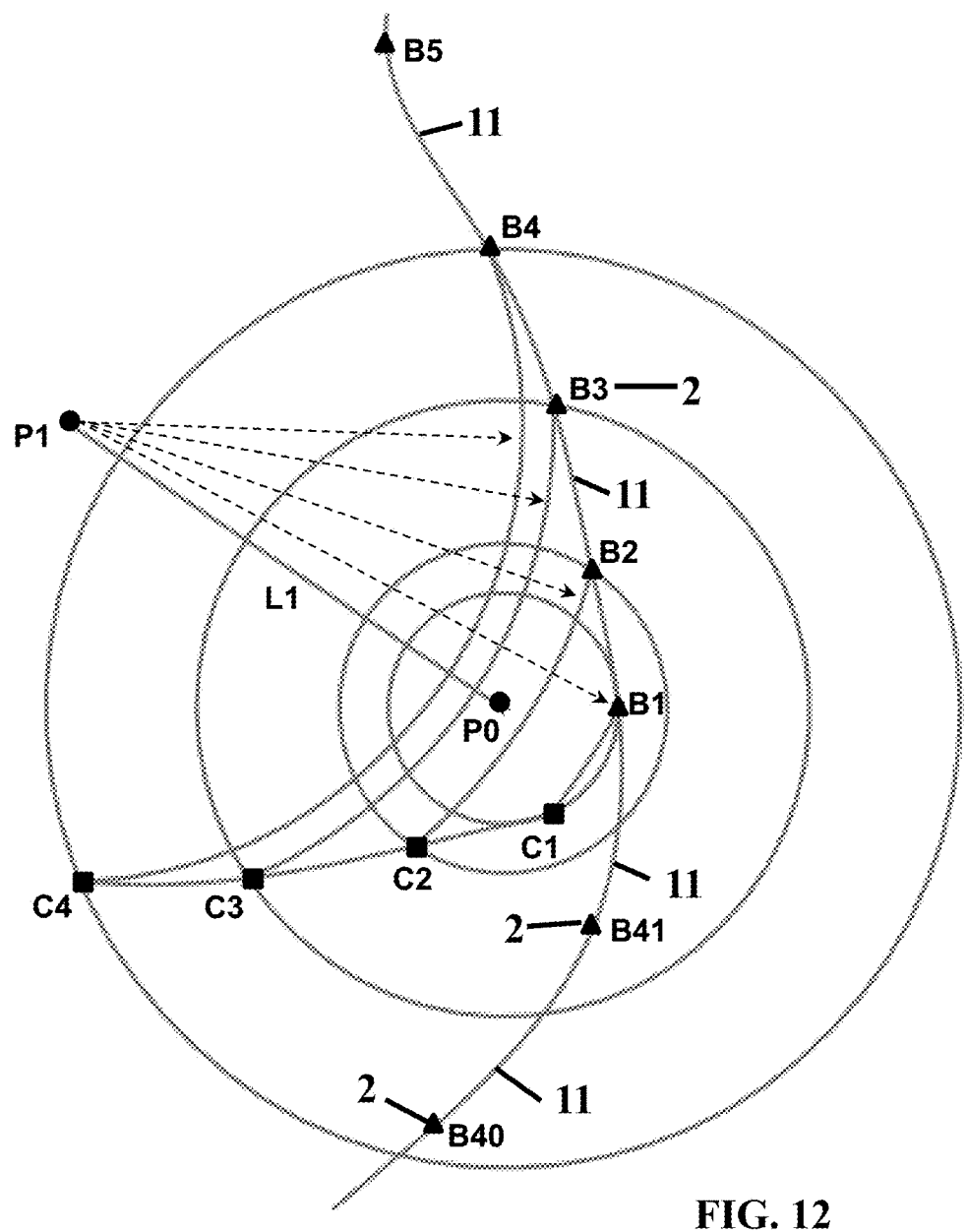
FIG. 12 illustrates the robotic lawn mower travels in a lawn and broadcasts ultrasonic waves toward boundary stands, to determine the positions of boundary stands.

FIG. 12 illustrates the robotic lawn mower 1 travels a distance L1 in a predetermined direction from the position P0 to the position P1, and at the position of P1, the mower broadcasts another ultrasonic wave. The ultrasonic wave takes different time lengths to reach boundary stands B1, B2, B3, and B4, as shown the partial circles in the figure. Based on the measured time-of-flights, the distances in between the robotic lawn mower 1 at position P1 and the boundary stands B1, B2, B3, and B4, are determined. With the known positions of P0 and P1, and the measured time-of-flights or distances, the positions of boundary stands 2 could be the group of B1, B2, B3, and B4, or the group of C1, C2, C3, and C4. Both groups of boundary stands 2 are located at positions where sound wave may travel to at the right timings. The positions of boundary stands 2 are not clearly defined due to that there are two possible groups of positions. For this configuration, the boundary stands B1 to B4 are the real ones, while C1 to C4 are virtual ones.

Figure 13:
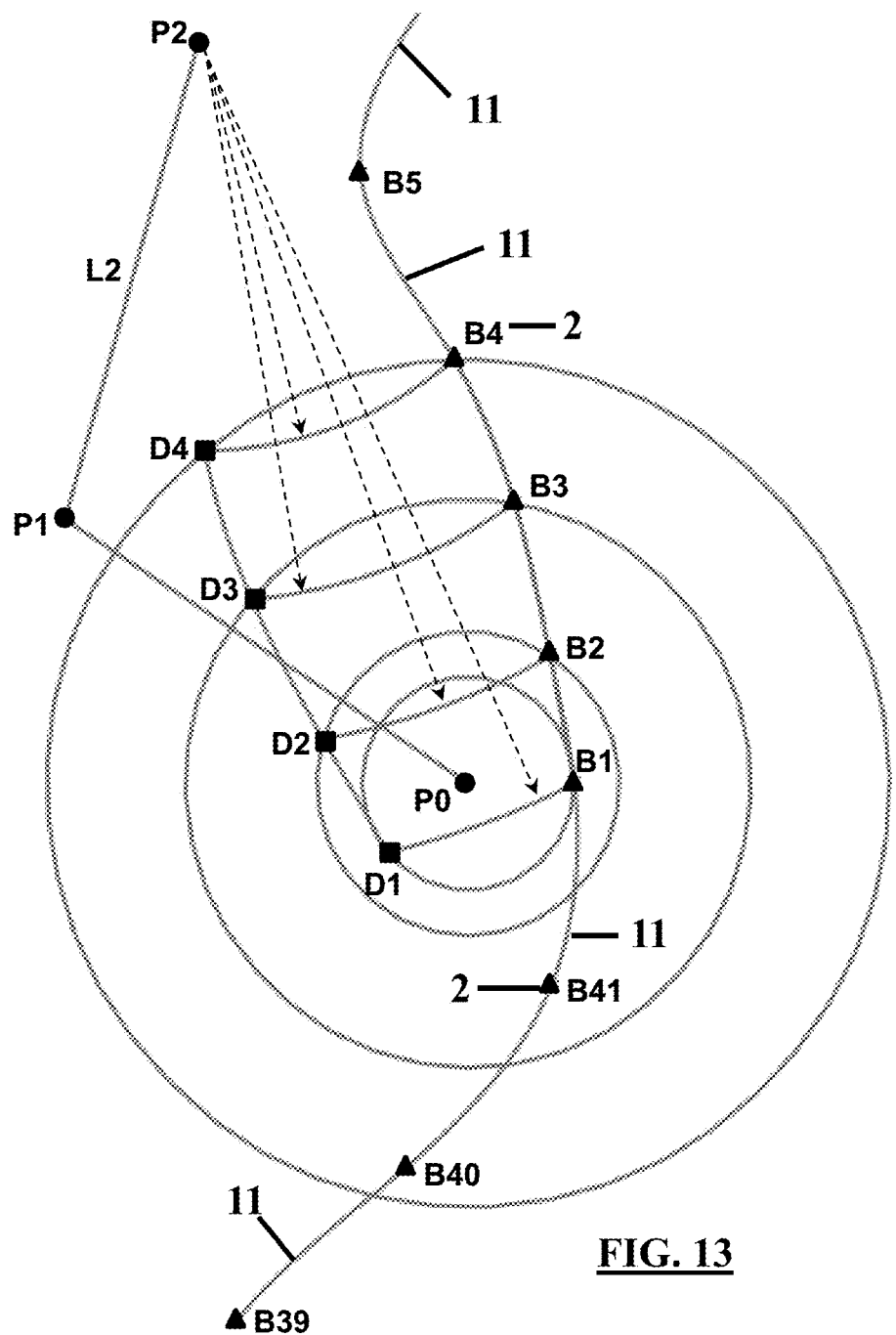
FIG. 13 illustrates the robotic lawn mower travels in a lawn, and broadcasts ultrasonic waves toward boundary stands, to determine the positions of boundary stands.

FIG. 13 illustrates the robotic lawn mower 1 travels another distance L2 in another predetermined direction from the position P1 to the position P2, and at the position of P2, the mower broadcasts another ultrasonic wave. The ultrasonic wave travels different distances and takes different times to reach boundary stands B1, B2, B3, and B4 as shown the partial circles in the figure. Based on the measured time-of-flights, the distances in between the robotic lawn mower 1, at position P2, and the boundary stands, B1, B2, B3, and B4, are determined. With the known positions of P0 and P2, and the measured time-of-flights or distances, the positions of boundary stands 2 could be the group of B1, B2, B3, and B4, or the group of D1, D2, D3, and D4. Both groups of boundary stands 2 are located at positions where sound wave may travel to at the right timings. The two groups of possible positions of boundary stands 2 cause the ambiguity such that the positions of boundary stands 2 are not clearly defined.

Figure 14:
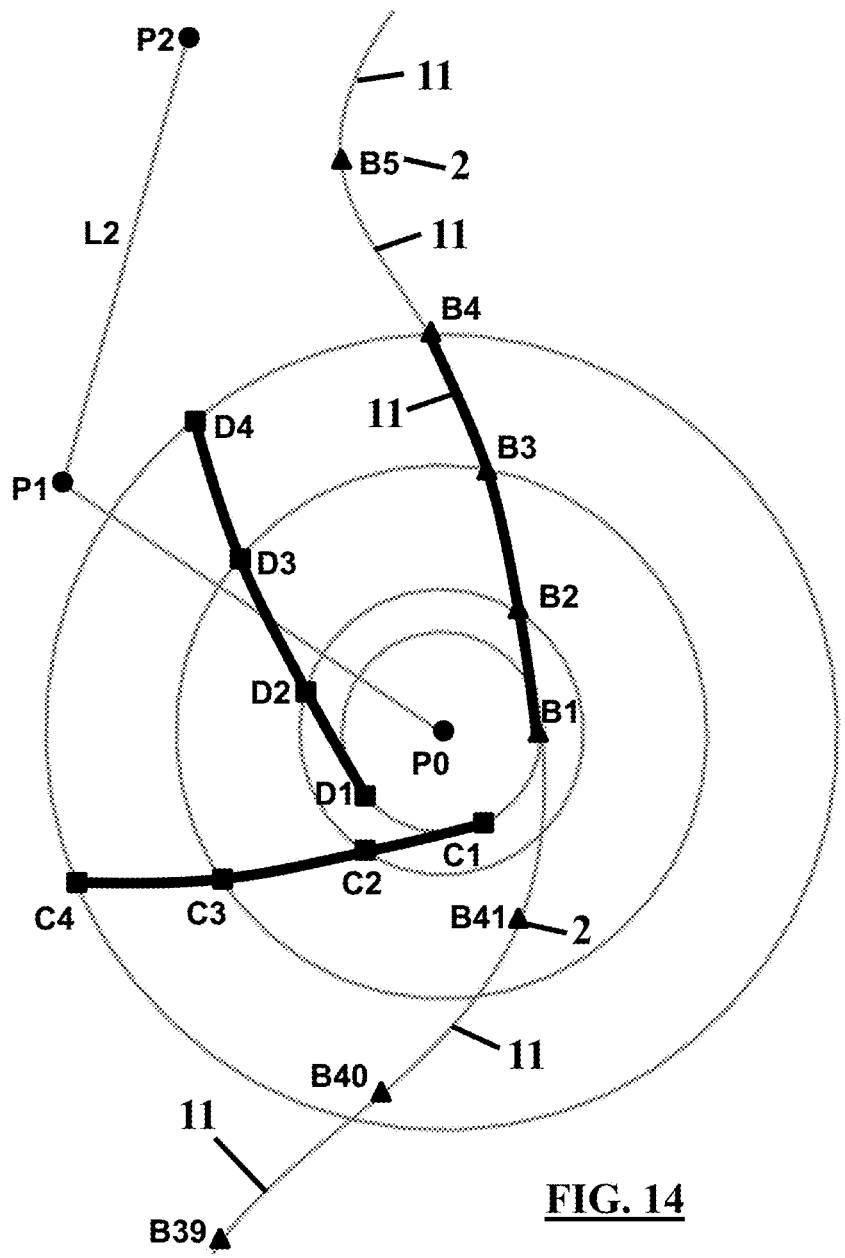
FIG. 14 illustrates the robotic lawn mower travels in a lawn, and broadcasts ultrasonic waves toward boundary stands, to determine the positions of boundary stands.

FIG. 14 illustrates the possible positions of boundary stands 2, which are groups of B1, B2, B3, and B4 and the group of C1, C2, C3, and C4, when the robotic lawn mower 1 broadcasts the sound waves at the position P0 and P1, and it also illustrates the possible positions of boundary stand 2, which are group of B1, B2, B3, and B4 and group of D1, D2, D3, and D4, when the robotic lawn mower 1 broadcasts the sound waves at the positions of P0 and P2. Combining above two scenarios, the positions of boundary stands are left to be only at B1, B2, B3, and B4. In one embodiment, the relative positions of the robotic lawn mower 1 and boundary stands 2 are determined when the mower broadcasts sound waves and travels from position P0 to position P1, and also when mower broadcasts sound waves and travel from position P1 to position P2. In one embodiment, as the robotic lawn mower 1 keep traveling to new positions and keep broadcasting ultrasonic waves, the relative positions in between robotic lawn mower 1 and boundary stands 2 are calculated and defined.

Figure 15:
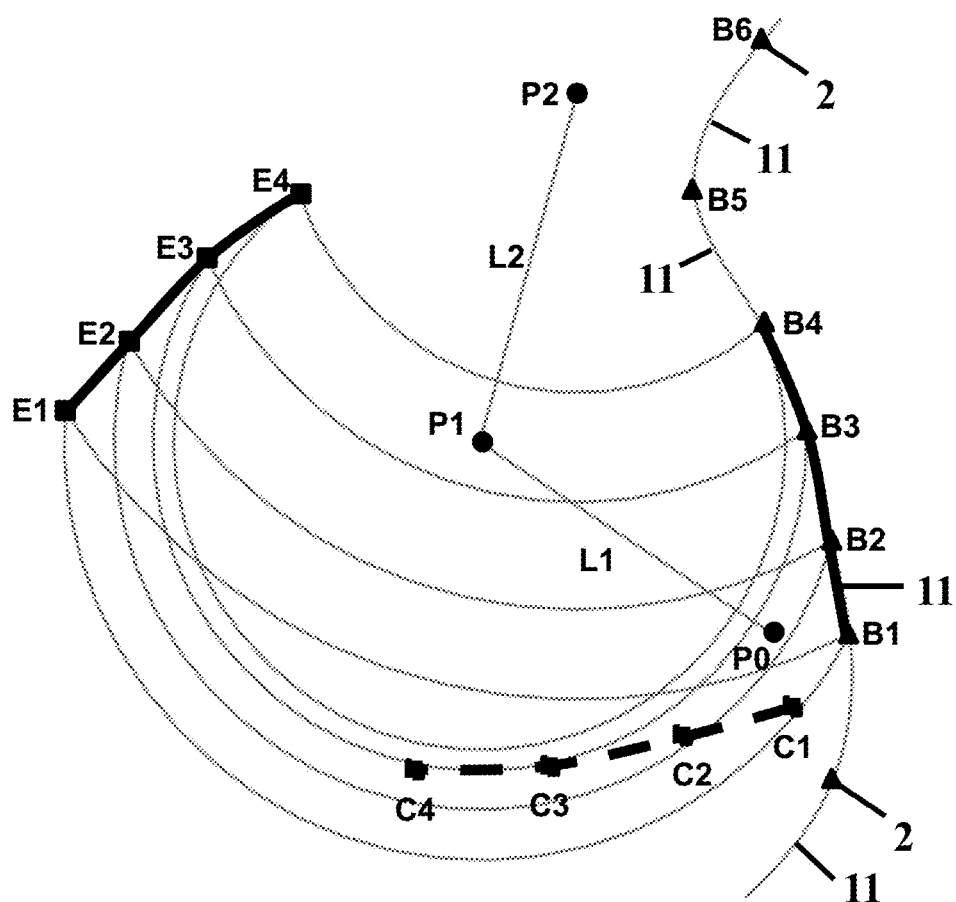
FIG. 15 illustrates the robotic lawn mower travels in a lawn, and broadcasts ultrasonic waves toward boundary stands, to determine the positions of boundary stands.

FIG. 15 illustrates that after two groups of possible positions of boundary stands, B1 to B4 and C1 to C4 are obtained when the robotic lawn mower 1 broadcasts sound waves and travels from position P0 to position P1, the mower now further travels a distance L2 in a predetermined direction to position P2 to broadcast another ultrasonic wave. The ultrasonic wave travels different times and different lengths to reach boundary stands B1, B2, B3, and B4, as shown the partial circles in the figure. Based on the measured time-of-flights, the distances in between the robotic lawn mower 1, at position P2, and the boundary stands, B1, B2, B3, and B4, are determined. The positions of boundary stands 2 could be the group of B1, B2, B3, and B4, or the group of E1, E2, E3, and E4. Both groups of boundary stands 2 are located at positions where sound wave may travel to at the right timings. The two groups of possible positions of boundary stands 2 cause the ambiguity such that the positions of boundary stands 2 are not clearly defined. Similar as previous approach, the combined scenarios, B1 to B4 and C1 to C4 as shown in FIG. 12, and B1 to B4 and E1 to E4 as shown in FIG. 15, lead to that only B1 to B4 are the correct positions of boundary stands 2. In one embodiment, the relative positions of the robotic lawn mower 1 and the boundary stands 2 are determined with known positions of P0, P1, P2, and the measured time-of-flights of ultrasonic waves in between the robotic lawn mower 1 and the boundary stands 2. In one embodiment, as the robotic lawn mower 1 keep traveling to new positions and keep broadcasting ultrasonic waves at new positions, the relative positions in between the robotic lawn mower 1 and the boundary stands 2 are calculated and defined. In one embodiment, the relative positions of the boundary stands 2 and the robotic lawn mower 1 may be determined by different sound waves broadcasted at different positions at different times. In one embodiment, the robotic lawn mower 1 has a microcontroller to analyze the relative positions of boundary stands 2 and the boundary stands 2, such that the robotic lawn mower 1 may change the mowing route depending on the collected position data.

Figure 16:
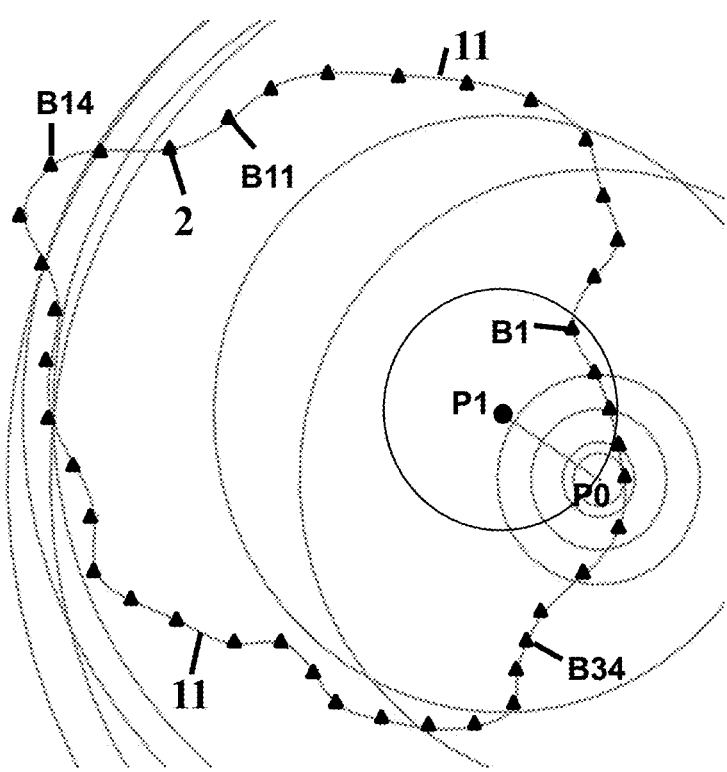
FIG. 16 illustrates the robotic lawn mower travels in a lawn, and broadcasts ultrasonic waves toward boundary stands, to determine the positions of boundary stands.

The robotic lawn mower 1, in FIG. 11 to FIG. 15, determines its relative position with respect to boundary stands B1 and B4. In one embodiment, the robotic lawn mower determines its relative position with respect to both nearby and farther boundary stands 2. In one embodiment, the robotic lawn mower 1 may select certain boundary stands 2, located at nearby or faraway locations, to determine the relative positions. FIG. 16 illustrates that when the robotic lawn mower 1 is far away from some boundary stands 2, the selection of fewer farther boundary stands 2 to calculate the relative positions may reduce the calculation loading of the microcontroller on the mower.

Figure 17:
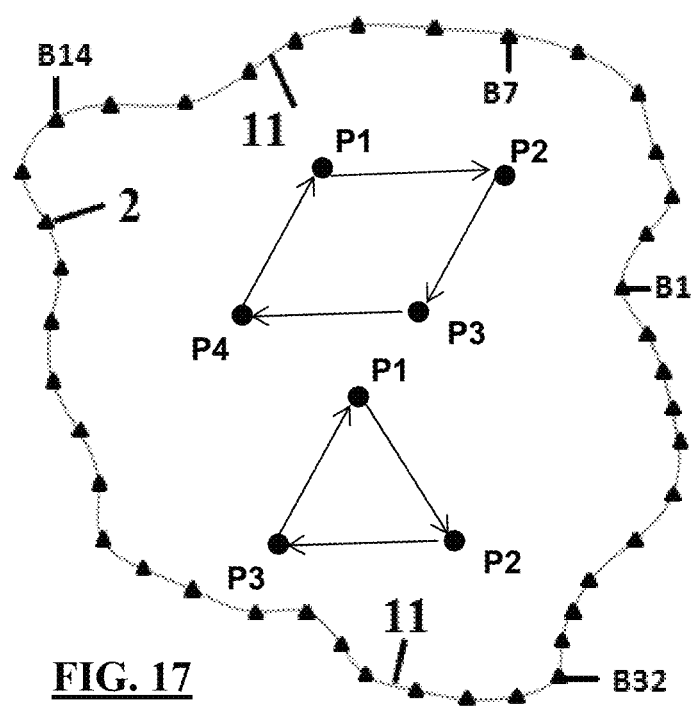
FIG. 17 illustrates the robotic lawn mower travels in a lawn, and broadcasts ultrasonic waves toward boundary stands, to determine the positions of boundary stands.

FIG. 17 illustrates that the robotic lawn mower 1 travels several predetermined lengths in predetermined directions to various positions, such as P1 to P4 of the rectangular route, or the P1 to P3 of the triangular route, such that the relative positions of boundary stands 2, and the geometry or shape of lawn are determined. In one embodiment, before the grass cutting, the robotic lawn mower may be programmed to travel some distances in the lawn in order to capture the lawn geometry. The robotic lawn mower 1 may travel along the lawn border firstly to capture the geometry of the lawn and save the lawn geometry in a memory device.

Figure 18:
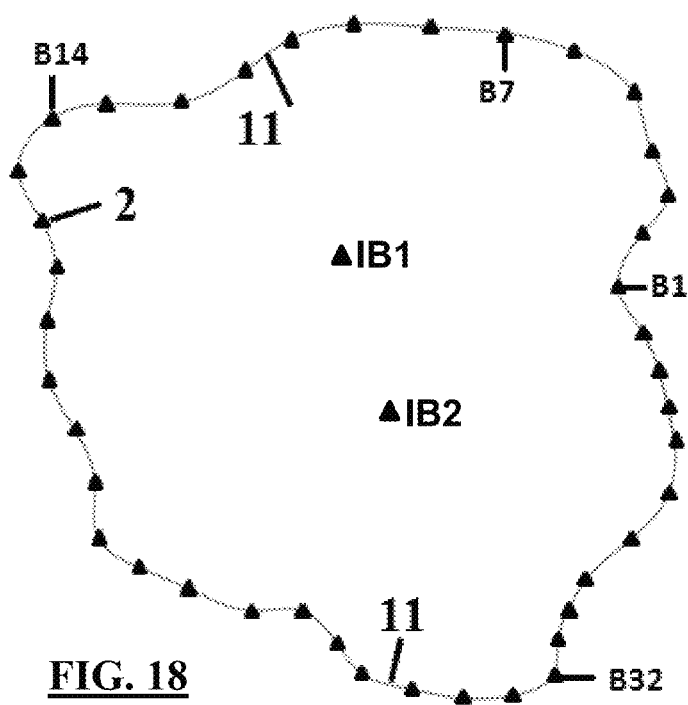
FIG. 18 illustrates the boundary stands are located in the middle of the lawn.

The boundary stands 2 are typically placed along the lawn boundary which is at the outside or exterior border of the lawn. In one embodiment, placing of the boundary stands 2 at the interior of lawn may be used to guide the moving of the robotic lawn mower 1, especially if the lawn geometry is complicated or irregular. FIG. 18 illustrates one example of two interior boundary stands, IB1 and IB2, are placed in the middle of the lawn. In one embodiment, each interior or exterior boundary stand 2 may send the distance data along with a signal to include boundary stand's condition or environment to the robotic lawn mower 1. The signal of boundary stand's condition or environment is defined as condition signal in this disclosure. The condition signal indicates that the boundary stands 2 are located at the interior or exterior of the lawn.

Figure 19:
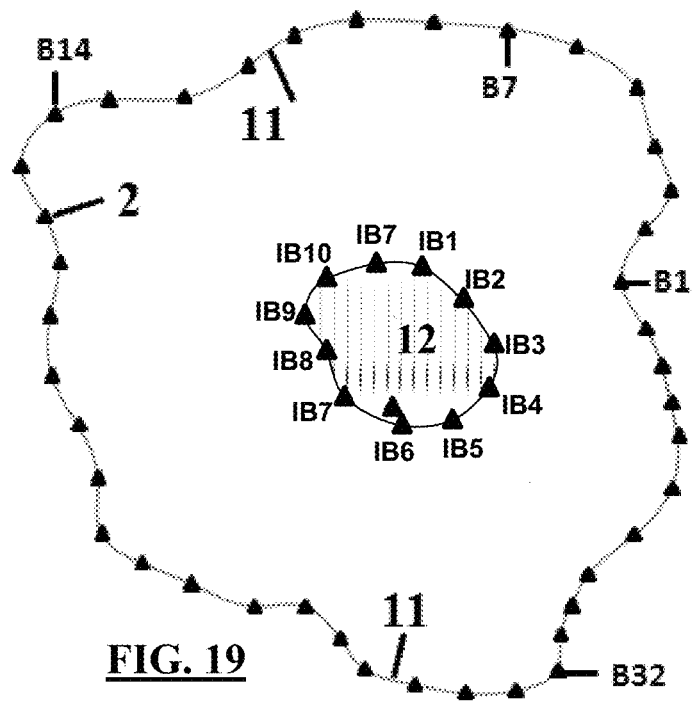
FIG. 19 illustrates the boundary stands located along the boundary of an object in the lawn.

In one embodiment, the boundary stands 2 are placed along the boundary of an object or block area located in the lawn, as shown in FIG. 19. The RF transceivers on these internal boundary stands 2 may transmit the distance data, along with the condition signals to include the info of the object or block area 12, to the robotic lawn mower 1. In one embodiment, the robotic lawn mower 1 uses the condition signal to distinguish the RF signal is from an exterior boundary stand 2, from an interior boundary stand 2 which is not enclosing an object, or from an interior boundary stand 2 which is enclosing an object. With the condition signals, the microcontroller on the robotic lawn mower 1 may calculate a better route to mow the lawn area around the objects and around the lawn border. In one embodiment, each boundary stand 2 may contain a unique ID number, and the RF transceiver on the boundary stand may send distance data, along with the ID number, to the mower, such that the mower tells the distance data is from which boundary stand 2. The definition of ID numbers of boundary stands may be achieved with either software or hardware methods.

Figure 20:
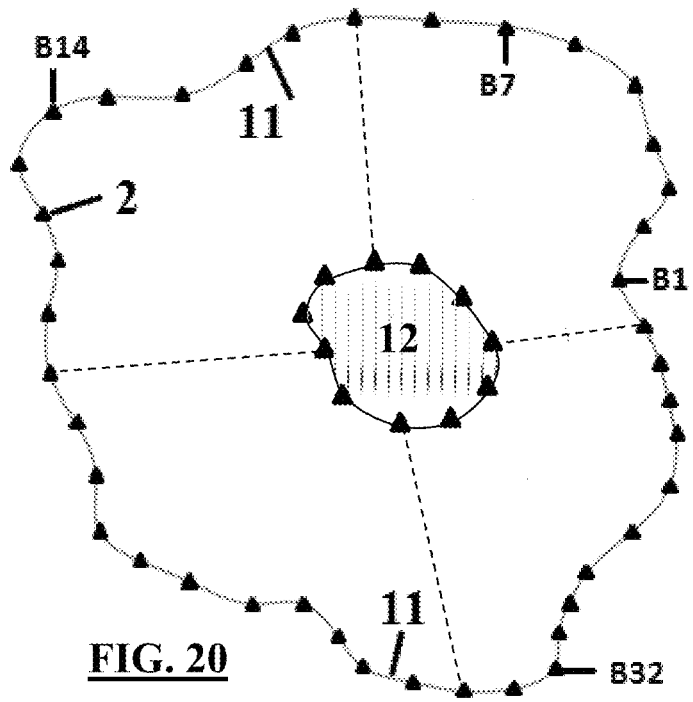
FIG. 20 illustrates a larger lawn area is virtually split to several smaller lawn areas.

In one embodiment, a lawn area may be split virtually to several lawn areas with several groups of the boundary stands 2 enclosing the lawn areas. Each group of boundary stands 2 may enclose a specific lawn area and have a group number or group ID, such that when the robotic lawn mower 1 travels to the specific area, it will use the group of boundary stands 2 to define its mowing route. Each boundary stand 2 may belong to one or more than one group of boundary stands 2. In one embodiment, when the RF transmitters on the boundary stands 2 send the distance data to the robotic lawn mower 1, the group number of boundary stands 2 may be sent along as well. The group number information, which is also a condition signal, may help the mower define a better route. FIG. 20 illustrates a lawn area virtually split to 4 areas, and each area is enclosed by a group of boundary stands 2. In one embodiment, the robotic lawn mower 1 may finish the mowing of one area firstly then travel to the next area to finish the mowing of next area, such that the mower is doing the mowing with an area-by-area scheme. In another embodiment, the mower may travel across more than one area to mow several areas altogether.

Figure 21:
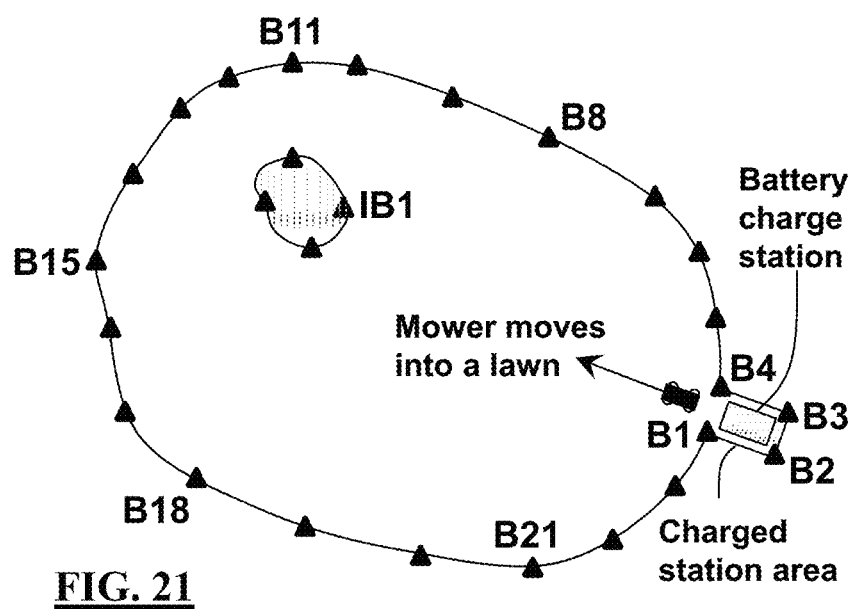
FIG. 21 illustrates the utilizations of condition signals of the boundary stands.

The robotic lawn mower 1 may use condition signals from boundary stands 2 for various situations. FIG. 21 illustrates boundary stands B1 to B4 may be used to control the robotic lawn mower 1 to enter a battery charge station when the mower is short of electric power, and to confine the mower inside the charged station area. The condition signals of boundary stands B1 to B4 may be different from other condition signals such that the robotic lawn is guided to the charge station. The boundary stands B1 to B4 may have specific ID numbers to indicate that they are for charged station area. In one embodiment, one or more than one of the boundary stands 2 may be used to guide the first moving of the robotic lawn mower 1. Before moving out the charge station area, the mower may be programmed to move for example closer or half distance to for example boundary stand IB1 or B15 in FIG. 21, such that the mower moves out the charge station and goes to central open area in the lawn. After the first move, the mower starts picking up the relative distances to determine its position with respect to other boundary stands. In another embodiment, after moving out the charge station, the robotic lawn mower 1 may move along the outside boundary stands 2, move along the interior boundary stands, or move along a predetermined route with predetermined pattern. The condition signals and ID numbers of boundary stands are different from the exact positions or coordinates of boundary stands 2. The condition signals and ID numbers indicate the environmental conditions in which the boundary stands 2 locate or belong to. The boundary stands 2 may be placed at locations according to the environment or condition of the lawn boundary, but the exact positions and coordinates of boundary stands 2 are not predefined. In this manner, users may use the boundary stands 2 at any lawn area at any places without the need to predetermine the exact positions or coordinates.

Figure 22:
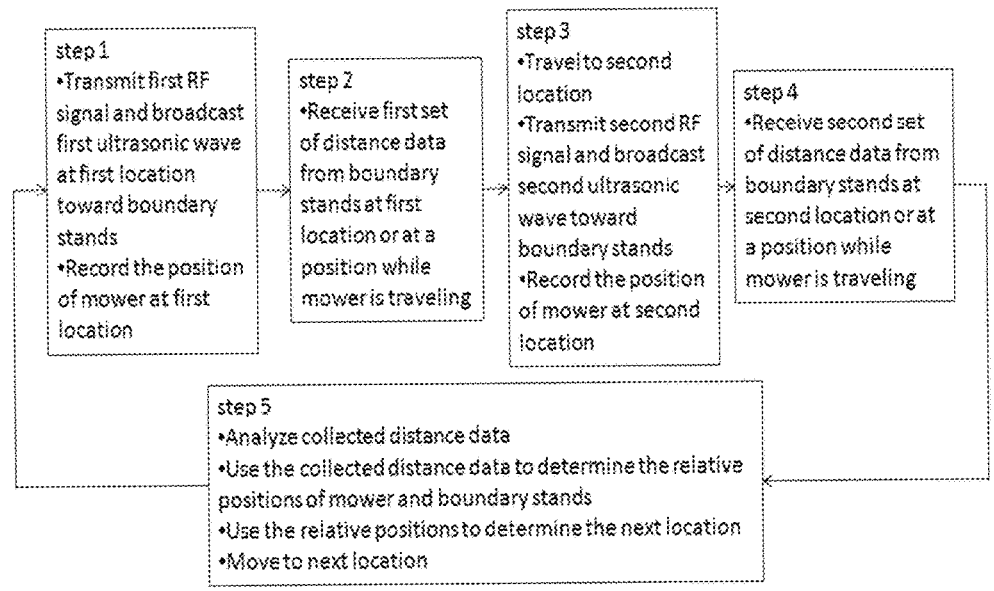
FIG. 22 illustrates the flowcharts of the robotic lawn mower and the boundary stands.
Figure 22:
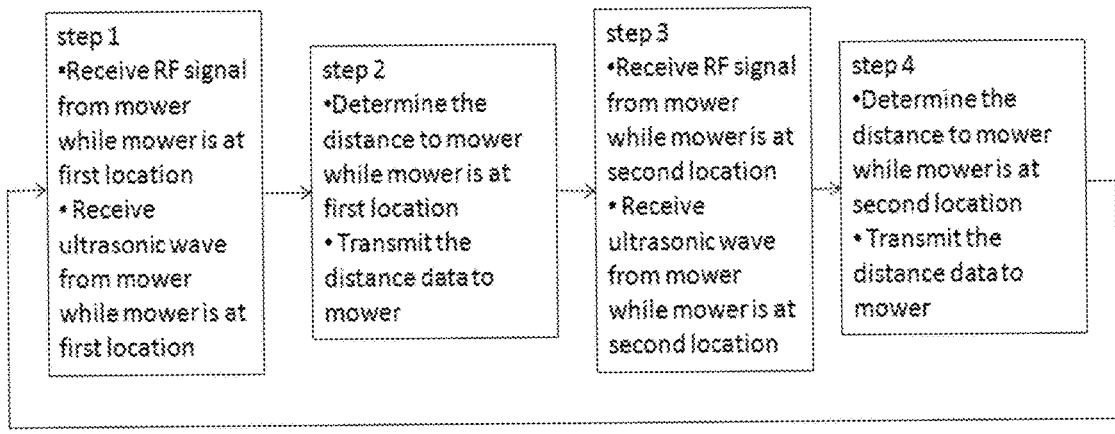

FIG. 22 illustrates the algorithm or workflow of the disclosure with a flowchart. For the mower, the step one is that the robotic lawn mower 1 at a first location in a lawn transmits an RF signal to calibrate or synchronize the time clocks of the boundary stands 2, and broadcasts an ultrasonic wave to boundary stands 2. For this step, the robotic lawn mower 1 records its original location. At step two, the robotic lawn mower 1 receives the first set of distance data from the boundary stands 2, and the robotic lawn mower 1 may be still at first location or at a very close by location considering that the RF and ultrasonic signals travel at very high speed. At step three, the robotic lawn mower 1 travels to another location to repeat the same works as step one. At this step, the mower also knows its current position when the robotic lawn mower 1 travels a predetermined length at a predetermined direction from the first location to the second location. At step four, the robotic lawn mower 1 receives the second set of distance data from boundary stands 2. At step five, the robotic lawn mower 1 analyzes the collected distance data and uses the distance data to determine the relative positions of mower and boundary stands 2. With the known relative positions of mower and boundary stands 2, the robotic lawn mower 1 may determine the next moving location. The five steps may be repeated such that the robotic lawn mower 1 may determine an economic or preferred mowing route.

In one embodiment, the synchronization and calibration of time clocks may be done only once or once in a while, and there is no need to repeat the procedure at each step. In another embodiment, the robotic lawn mower 1 may use many sets of collected distance data to better determine the relative positions of mower and boundary stands 2. The robotic lawn mower 1 may use two or three or more sets of collected distance data, thus the first set and second set of distance data in the flowchart are not limited to be only two sets or consecutive two sets. Similarly, the analysis of collect distance data is not limited to only two sets or only to consecutive sets of distance data.

For each boundary stand 2, at step one, receives RF signal to synchronize or calibrate the time clock, and also receives ultrasonic wave from the robotic lawn mower 1. At step two, each boundary stand determines its distance to the mower while the mower is at first location, and transmits the distance data to the robotic lawn mower 2. At step three and four, each boundary stand 2 repeats the same works as step one and two, respectively. The step one and two are actually similar as step three and four, except that the distance data are different because mower is at different locations. In one embodiment, the receiving of RF signal from mower for synchronization and calibration may be done only once or once in a while.

In one embodiment, the robotic lawn mower contains a WIFI or wireless device to send the info of positions to users, such that users control and monitor the mowing route with a computer, a cell phone, or a tablet. The controlling and monitoring may be through a local or a remote wireless network.

What is claimed is:

1. A mowing system for mowing a lawn, comprising:
a robotic lawn mower and a plurality of boundary stands, wherein said boundary stands are placed near a boundary of the lawn, wherein each boundary stand of said boundary stands does not store location coordinates of the boundary stand;
an ultrasonic transmitter is placed on said robotic lawn mower to broadcast ultrasonic waves toward said boundary stands, an ultrasonic receiver is placed on each boundary stand to receive ultrasonic waves from said robotic lawn mower, the time-of-flights of ultrasonic waves are measured to obtain the distances in between said robotic lawn mower and said boundary stands, an RF transceiver is placed on said robotic lawn mower and on each boundary stand to transmit and receive RF signals,
said RF transceiver placed on said robotic lawn mower transmits RF signal toward said boundary stands to synchronize and calibrate the time clocks of said boundary stands, and to receive distance data from said boundary stands,
said RF transceiver placed on each boundary stand receives RF signal from said robotic lawn mower to synchronize and calibrate the time clock of each boundary stand, and to transmit distance data to said robotic lawn mower,
wherein said robotic lawn mower moves first predetermined length in first predetermined direction to first position to broadcast first ultrasonic wave to collect first set of relative distances in between said robotic lawn mower and boundary stands, and said robotic lawn mower moves second predetermined length in second predetermined direction to second position to broadcast second ultrasonic wave to collect second set of relative distances in between said robotic lawn mower and boundary stands, such that said robotic lawn mower, with the continuous moving and the collection of said relative distances, determines its relative position with respect to said boundary stands, thereby, said robotic lawn mower defines a route to mow the lawn.

2. The mowing system of claim 1, wherein said boundary stands comprising:
boundary stands located at outer border of the lawn to confine said robotic lawn mower from traveling to outside of the lawn and to define outer lawn boundary,
boundary stands located at the interior of lawn to guide the moving of said robotic lawn mower,
and boundary stands located along the border of objects located in the lawn to prevent said robotic lawn mower from going across.

3. The mowing system of claim 2, wherein said boundary stands located at outer border of the lawn comprise said RF transceivers to transmit condition signals to said robotic lawn mower, said condition signals indicate said boundary stands are at the outer border of the lawn,
said boundary stands located at the interior of lawn comprise said RF transceivers to transmit condition signals to said robotic lawn mower, said condition signals indicate said boundary stands are at the interior of lawn,
said boundary stands located along the borders of objects located in the lawn comprise said RF transceivers to transmit condition signals to said robotic lawn mower, said condition signals indicate said boundary stands are along the border of objects in the lawn,
each boundary stand contains an ID number, such that said RF transceiver on each boundary stand transmits said ID number to said robotic lawn mower,
such that said robotic lawn mower distinguishes said boundary stands are at the outer border of the lawn, at the interior of lawn, along the borders of objects in the lawn, and said ID numbers of said boundary stands.

4. The mowing system of claim 1, wherein said boundary stands comprises a plurality of group ID to define a plurality of lawn areas, each group of said boundary stands encloses a lawn area, said RF transceivers on each group of said boundary stands transmit said group ID to said robotic lawn mower,
such that said robotic lawn mower determines its location with respect to the group of said boundary stands, and determines the mowing route.

* * * * *